Patented Sept. 10, 1940

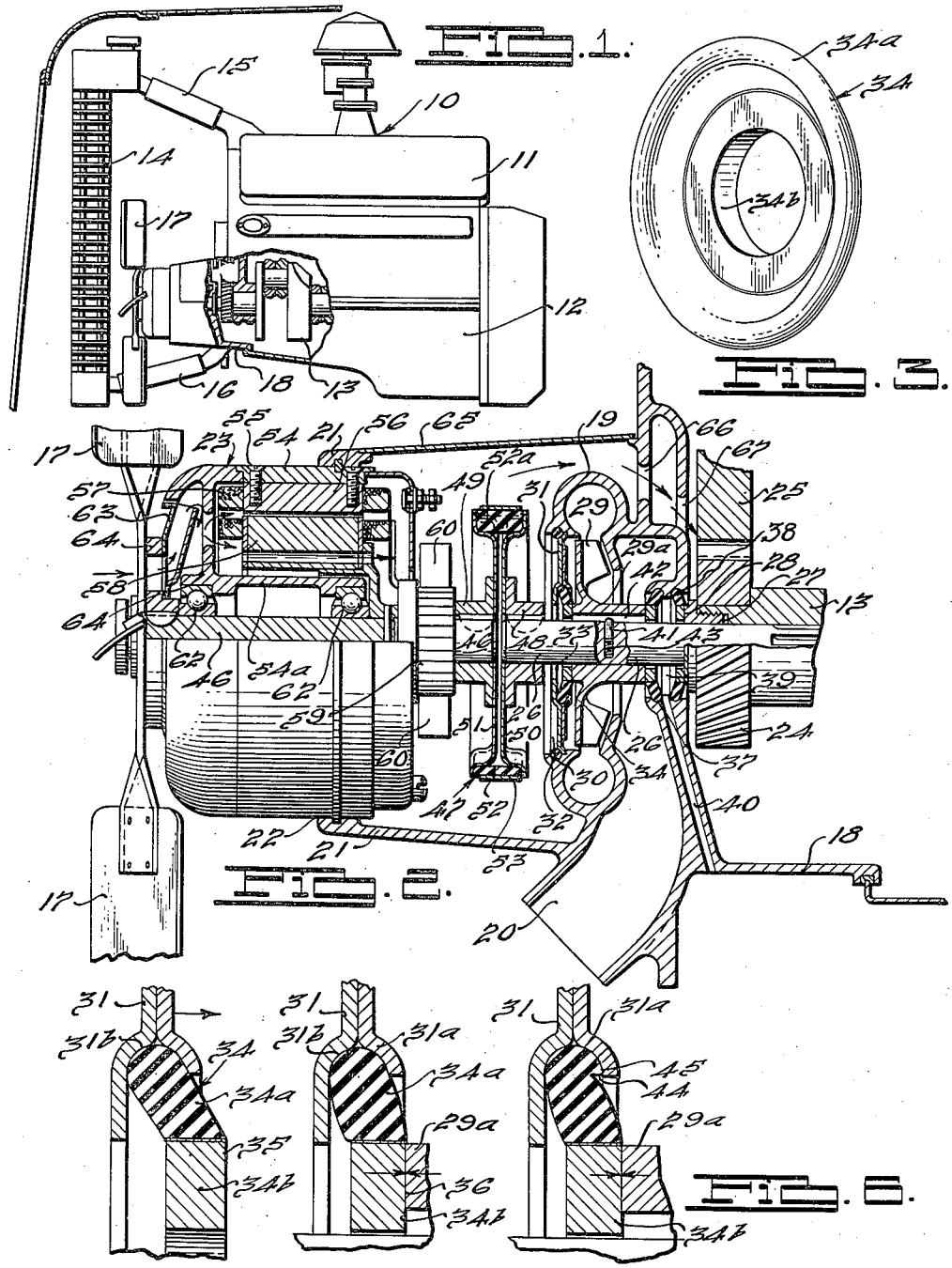

2,214,243

UNITED STATES PATENT OFFICE 2,214,243

SEAL FOR WATER PUMPS

Wesley C. Casson, Detroit, Mich., assignor to Briggs Manufacturing Company, Detroit, Mich., a corporation of Michigan Application October 7, 1937, Serial No. 167,790

4 Claims. (Cl. 286—11)

This invention relates generally to internal combustion engines and more particularly to a power plant embodying an internal combustion engine including a radiator, a fluid pump and an electric generator, as is the case, for instance, with automobile power plants.

One of the objects of the present invention is to provide an internal combustion engine or power plant having an electric generator, a radiator with a cooling fan, and a fluid pump delivering the cooling fluid to the radiator wherein it is cooled by the air stream produced by the fan, in which engine the conventional belt drive as well as the disadvantages thereof are completely eliminated, and a positive drive between the engine crankshaft and the above listed auxiliary devices is provided.

Another object of the invention is to provide an improved motor vehicle power plant in which auxiliary devices such as the fan, the fluid pump, and the generator, usually assembled or mounted onto the engine as separate units, are removed from the outside of the engine and incorporated into the structural contour thereof, whereby the engine is made more compact with its auxiliary devices covered.

Still another object of the invention is to provide an improved motor vehicle engine or power plant having a water pump, a generator and a fan, in which engine said devices are arranged along the longitudinal axis of the engine crankshaft in front of the engine, with their respective shafts forming an extension of the crankshaft.

Still another object of the invention is to provide a motor vehicle engine in which the electric generator is arranged immediately behind the radiator fan and is provided with improved means for producing circulation of cooling air through its structure.

A further object of the invention is to provide a liquid cooled motor vehicle engine in which the pump producing the circulation of the cooling liquid through the engine jacket and the radiator is adapted to be heated by the air which is passed successively through the radiator and the electric generator housing and is thus heated to a temperature sufficiently high to effect relatively rapid thawing of the pump if the same is frozen.

A still further object of the present invention is to provide a liquid cooled motor vehicle engine in which the impeller of the pump is heated by conduction from the engine crankshaft, thereby facilitating thawing of the pump in a case of freezing thereof.

A still further object of the invention is to provide a fluid cooled motor vehicle engine in which the pump and the generator are arranged in front of the crankshaft, their shafts abutting and drivingly connected by means of a flexible coupling.

A still further object of the invention is to provide a liquid pump for a liquid cooled internal combustion engine, which pump is provided with improved means preventing leakage of the pumped fluid.

A still further object of the invention is to provide a centrifugal pump for an internal combustion engine, in which pump there are provided improved sealing means preventing leakage of the cooling fluid around the pump shaft.

A still further object of the invention is to provide improved sealing means for the shaft of a centrifugal pump, which means are self-adjusting and self-compensating, ensure perfect sealing without the necessity of frequent adjusting and tightening as is the case with various packings, and do not cause excessive friction at the places of contact with the shaft.

A still further object of the invention is to provide a pump for a liquid cooled internal combustion engine in which means are provided whereby the danger of breakage of the pump when attempts are made to operate the pump when the same is frozen is eliminated.

It is an additional object of the present invention to provide an improved power plant of the foregoing character in which the improvements provided therein in accordance with the invention simplify the construction and enable easier servicing and repairing of the power plant.

Other objects of this invention will appear in the following description and appended claims, reference being had to the accompanying drawing forming a part of this specification wherein like reference characters designate corresponding parts in the several views.

Fig. 1 is a side view of a motor vehicle power plant embodying the present invention.

Fig. 2 is a vertical longitudinal sectional view through the front portion of the engine, illustrating the arrangement of the fan, the electric generator, and the pump on the extension of the engine crankshaft, as well as the details of construction of the pump and of the generator.

Fig. 3 is a perspective view showing one of the sealing rings.

Fig. 4 is a fragmentary sectional view showing one of the sealing rings in its position in the front plate before the same is installed in the pump housing.

Fig. 5 is a fragmentary sectional view of the pump showing the sealing ring compressed.

Fig. 6 is a view similar in part to Fig. 5, showing a modified construction of the sealing ring.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that th phraseology or terminology employed herein is for the purpose of description and not of limitation, and it is not intended to limit the invention claimed herein beyond the requirements of the prior art.

In the drawing there is shown, by way of example, a power plant assembly for a motor vehicle embodying the several features of the present invention. Referring to the drawing and more particularly to Fig. 1, said power plant assembly comprises an internal combustion engine 10 having a cylinder block 11 and a crankcase 12 within which there is operatively arranged a crankshaft 13 journalled in suitable bearings. The engine is of the water cooled type and it includes a radiator 14 provided with hose connections 15 and 16, with the aid of which the water jacket of the engine is connected with the radiator for the purpose of circulating the cooling fluid from the engine jacket into the raidator, wherein the water is cooled by the stream of air produced with the aid of a fan 17, and returned to the lower portion of the engine water jacket for the repeated cooling of the engine.

The circulation of a cooling liquid is effected by means of a rotative pump, in the present case a centrifugal pump, which is arranged in front of the crankshaft 13.

A front case 18 which may be formed integral with the crank case, or be formed or cast as a separate unit adapted to be attached to the front portion of the crankcase, as is the case in the present instance, forms a housing for the centrifugal pump, with a water inlet 20 leading from the hose 16 into the interior of the pump housing 19, and a forwardly protruding extension 21 provided with an aperture 22 into which is fitted a generator 23 secured therein by means of screws, not shown, or in any other suitable manner.

On the front end of the crankshaft 13 there is mounted a timing gear 24 meshing with a second timing gear 25. Within an axial hole provided in the front end of the crankshaft there is secured an extension 26 which may be secured to the crankshaft in any suitable manner. Under certain conditions it may be desirable to form said extension integral with the crankshaft. In the present instance, the extension is connected to the crankshaft by means of mating splined portions provided respectively in the bored end of the crankshaft and on the rear end of the extension 26. A collar 27 is provided on the end of the crankshaft, being secured thereto by means of a threaded connection, and it serves to secure the timing gear 24 and to provide a sealing face 28.

By virtue of the above construction the extension 26 is made coaxial with the crankshaft 13 and it is drivingly connected therewith. The extension 26 serves as the shaft for the centrifugal pump. An impeller 29 is mounted on the extension 26.

The front face of the housing 19 is provided with an aperture 30 adapted to receive a disk 31 adapted to be sealed around its edge by a rubber ring 32 arranged in a groove provided around the edges of said aperture. Provision of the disk 31 permits easy disassembly of the pump and removal of the impeller. For the removal of the disk 31 it is sufficient to secure hold of the ring 32 at any place thereof and remove it by pulling inwardly. It should be noted that pressure on the disk 31 in the direction of the axis of the pump shaft 26 without removing the ring 32 will cause greater compression of the ring 32 and more perfect sealing of the disk around its edges. Thus, a perfect sealing of the disk is effected while an extremely easy removal of the disk is nevertheless permitted.

The disk 31 is provided with a central opening 33 for the passage of the pump shaft 26. Around said opening 33 and on the rear face of the disk there is provided a groove adapted to receive a sealing ring 34. In the present embodiment, the disk 31 is made of two pieces, having a piece 31a spot welded or otherwise secured to the inner face thereof. The inner edges of the disk portions 31 and 31a are shaped as shown in the drawing in order to provide, when said pieces are assembled, the above mentioned groove, indicated at 31b, for the sealing ring 34.

The sealing ring 34, shown separately in Fig. 3, comprises an annular rubber member 34a made in the form of a section of a hollow cone, or a tapering ring, to the inner edges of which there is bonded or otherwise secured a ring 34b. The ring 34a is made of a highly resilient material, such as rubber, while the flat-sided washer or ring 34b is made of any suitable anti-friction material. When the ring 34 is in its operative position in the pump, the face 35 of the anti-friction washer 34b contacts the face 36 of the impeller hub 29a. The length of the impeller hub 29a and the shape of the ring 34 are so selected that in the assembled position the ring 34 is considerably distorted and brought closer to the form of a disk. In consequence thereof, the resiliency of the material of the rubber part 34a of the sealing ring produces a sufficient resilient pressure on the face 36 of the impeller hub to prevent leakage of the fluid from the pump housing between the faces 35 and 36.

A sealing ring 37 similar in its construction to the ring 34 is provided at the rear end of the impeller hub 29a and it serves to seal said rear end thereof. A third sealing ring 38 is provided adjacent the ring 37, and the anti-friction ring thereof contacts the face 28 of the collar 27 thus providing a double seal for the shaft 26 at the rear face of the housing 19. Both sealing rings 37 and 38 are adapted to fit into the grooves formed in the aperture 39 provided in the rear face of the pump housing 19. A drain 40 is provided for the purpose of draining off any liquid which may collect between the rings 37 and 38.

In Fig. 4 there is shown a portion of the disk 31 and the ring 34 in assembled position but before said disk is arranged in its operative position in the pump housing 19. Fig. 5 illustrates the shape of the ring 34 in its distorted form, when the disk 31 is arranged within the aperture 30 of the pump casing 19.

In selecting the resilient material for the ring 34 and the dimensions of the resilient part thereof, the same should be so chosen that the ring 34 is capable of resisting the reaction of the impeller at higher speeds thereof, and sufficient clearance should be allowed within the pump housing for the floating of the impeller because of the varying magnitude of said reaction at the various speeds.

In Fig. 6 there is illustrated a sealing ring of a modified form in which a groove 44 is provided. By virtue of the provision of said groove the fluid pressure existing within the pump casing operates to press the thin flange 45 against the flange of the disk 31a, thus making the seal around the outside edges of the sealing ring still more perfect.

In selecting materials for the impeller 29 and the anti-friction ring 34b, it is desirable to select such materials that rub best against each other when the fluid of the pump acts as the lubricant for them. I prefer to use a cast iron impeller with a carbon ring rubber-bonded to the resilient ring 34a. However, Bakelite or soy bean anti-friction rings, either solid or provided with brass seals, also give satisfactory results. Under certain conditions it is also advantageous to make a Bakelite impeller with an anti-friction ring made of steel, cast iron or bronze. Soy bean impellers may work well with steel, cast iron or bronze anti-friction rings.

By virtue of the above construction the impeller 29 is made floating between the sealing rings 34 and 37. From an examination of the drawing it is clear that no leakage can take place through the hub of the impeller 29 and by sealing the faces thereof an excellent sealing of the shaft 26 of the pump is effected. It is an important advantage of the present invention that the sealing rings are self-adjusting and self-compensating, since resiliency of the outside portion of the ring compensates for any misalignment or wear. No adjusting or tightening of the seals, as is necessary with packing boxes, is necessary with the use of my improved sealing means and the same can operate successfully for a very long period of time without requiring any attention. This feature is very important, since an average driver cannot be depended upon and does not desire to be bothered with the adjustment of the pump packings.

The driving connection of the impeller 29 and the pump shaft 26 is effected by means of a coupling pin or key 41 provided with a rounded or slanted end engaging a slot 42 provided in the impeller 29. A spring 43 is adapted to push the pin 41 out of a hole provided in the pump shaft and into a position for drivingly engaging the impeller 29. Because of the rounded end of the key, a certain component force acting along the axis of said key 41 is produced when any driving effort is transmitted by said key. When such driving effort exceeds a predetermined maximum, the component force exceeds the resistance of the spring 43, and the key 41 is pushed into the hole, in consequence whereof the shaft 26 may rotate while the impeller 29 remains stationary. By virtue of the above described construction, breakage of the impeller or of the shaft in cases of freezing of the pump is prevented.

The generator 23 is arranged in front of the above described pump and in such a position that its armature shaft 46 is disposed along the continuation of the axis of the water pump shaft 26. The shafts 26 and 46 are drivingly connected by means of a universal coupling generally indicated by the numeral 47. Said coupling comprises two collars 48 and 49 keyed or otherwise secured to the ends of the shafts 26 and 46, respectively. To said collars are spot welded or otherwise secured two disks 50 and 51, the outer ends of which are bent as shown in the drawing in order to form a circular groove for the reception of a rubber ring 52. The rubber ring 52 is provided on its inner surface with a number of teeth 52a entering corresponding depressions in the disks 50 and 51. A metal band 53 is provided in order to retain the ring 52 in place. In operation, the teeth 52a are put in shear and thereby transmit the rotative effort or torque from the shaft 26 to the shaft 46.

The generator 23 includes a two-piece casing 54 to which is secured, by means of screws 55, field pieces 56 provided with suitable field coils 57. The armature shaft carries an armature 58 and a commutator 59 cooperating with brushes 60. Ball bearings 62 are provided between the front piece 54a of the housing 54 and the shaft 46. On the front extremity of the shaft 46 is secured the fan 17 designed to produce a strong stream of air through the radiator 14. A second fan 63 designed to cool the generator is provided immediately behind the main fan 17. Said second fan 63 is made preferably of a steel stamping and is attached to the hub 64 to which the main fan 17 is also secured. The fan 63 operates to draw the air through the radiator 14 and to force such air under a slight pressure through the generator housing past the field and armature coils in order to cool the same. The air so forced is discharged at the rear end of the generator, and because of the provision of a jacket 65, it flows around the pump casing 19, as indicated by the arrows, and further through the holes 66 and 67 provided in the rear wall of the front case 18 and into the crankcase.

It will now be understood in view of the foregoing that upon reaching the pump housing the air is heated to a considerable temperature, since it has been first heated in the radiator 14 and thereupon heated to a still higher temperature in the generator 23, and therefore the washing of the pump casing 19 by the air so heated operates to heat said casing. Normally, the amount of heat imparted to the casing 19 is not sufficient to raise the temperature thereof to any appreciable degree, since the coolant flowing through the pump carries said heat away. However, in cases where the pump is frozen and there is no flow of coolant therethrough, the flow of air around the casing 19 operates to heat the same to a sufficiently high temperature within a relatively short time, thereby melting the frozen coolant in the pump from the outside thereof. It should be noted that the pump is also heated from the inside by the conduction of heat from the crankshaft, thus being heated from the outside and from the inside, the water pump in my improved power plant is thawed within a short time after the engine is started.

It should also be noted that the air, after passing around the water pump, flows through the crankcase and produces the necessary ventilation thereof by carrying out the gasoline vapors which upon condensation operate to dilute the oil contained in the crankcase.

It will now be understood from the above description that numerous advantages are attained in my improved power plant by the above arrangements of its operative parts. By virtue of the arrangement of the water pump and the generator on the extensions of the crankshaft, there is thus effected a direct drive from the crankshaft to the pump and the generator eliminating the necessity of providing belts, chains and other means used for the transmission of power to said devices in conventional structures.

The attainment of other objects of the invention specified above is clear from an examination of the drawing in view of the above description.

I claim:

1. In sealing means for a water pump shaft provided with a rotor having a face extending transversely of said shaft, a rubber ring in the form of a tapering tube encircling said shaft, and a ring of anti-friction material affixed to said rubber ring and adapted to come in contact with the face of said rotor, said rubber ring being adapted, when in operative position, to be compressed radially to exert axial sealing pressure on said anti-friction ring in the direction of said face.

2. Sealing means for a water pump shaft provided with a rotor having a face extending transversely of said shaft, said means comprising a rubber ring in the form of a tube tapering toward said face adapted, when compressed toward its center, to bulge out longitudinally of the shaft, and a ring of anti-friction material secured to said rubber ring to the inner surface thereof and adapted to be pushed by said ring to the rotor face to effect a seal thereat.

3. Sealing means for a water pump shaft provided with a rotor having a face extending transversely of said shaft, said means comprising a rubber member shaped as a frustum of a hollow cone extending with its narrow end axially of said shaft toward said face, and a ring of anti-friction material cemented to said rubber ring, said rubber ring being radially compressed to exert axial pressure on said anti-friction ring and to bring the same into sealing contact with said face.

4. Sealing means for a water pump having a casing and a shaft provided with a rotor having a face extending transversely of said shaft, said means comprising a rubber member shaped as a frustum of a hollow cone its thinner end pointing toward said face, and a ring of anti-friction material cemented to the thinner end of said rubber ring, said rubber ring being radially compressed to exert axial pressure on said anti-friction ring and to bring the same into sealing contact with said face, said rubber ring being provided with a groove to form a thin flange adapted to be pressed by the fluid to the pump casing.

WESLEY C. CASSON.